(12) United States Patent
Chuang et al.

(10) Patent No.: US 7,765,414 B2
(45) Date of Patent: *Jul. 27, 2010

(54) CIRCUIT AND OPERATING METHOD FOR INTEGRATED INTERFACE OF PDA AND WIRELESS COMMUNICATION SYSTEM

(75) Inventors: Hsun-Hsin Chuang, Tauyuan Hsien (TW); Hsi-Cheng Yeh, Taoyuan (TW); Chih-Chao Hsieh, Taipei Hsien (TW); Shi-Je Lin, Taipei (TW); Wen-Hsing Lin, Taipei (TW)

(73) Assignee: HTC Corporation, Taoyuan County (TW)

( * ) Notice: Subject to any disclaimer, the term of this patent is extended or adjusted under 35 U.S.C. 154(b) by 267 days.

This patent is subject to a terminal disclaimer.

(21) Appl. No.: 11/844,349

(22) Filed: Aug. 23, 2007

(65) Prior Publication Data
US 2008/0034233 A1 Feb. 7, 2008

Related U.S. Application Data

(63) Continuation of application No. 10/249,403, filed on Apr. 7, 2003, now Pat. No. 7,278,032.

(30) Foreign Application Priority Data
Aug. 15, 2002 (TW) .............................. 91118369 A

(51) Int. Cl.
G06F 1/00 (2006.01)
G06F 11/30 (2006.01)
G06F 13/38 (2006.01)
G06F 13/00 (2006.01)

(52) U.S. Cl. ...................... 713/300; 713/330; 713/340; 710/62; 710/100

(58) Field of Classification Search .................. 713/300, 713/330, 340; 710/62, 100
See application file for complete search history.

(56) References Cited

U.S. PATENT DOCUMENTS
5,570,025 A * 10/1996 Lauritsen et al. ............ 324/433
(Continued)

FOREIGN PATENT DOCUMENTS
CN 1200855 12/1998
(Continued)

OTHER PUBLICATIONS
"Power Supply Management IC and Li-Ion Battery Charge Control", TWL2213CA, Texas Instruments, p. 1-p. 31.
(Continued)

Primary Examiner—Ji H Bae
(74) Attorney, Agent, or Firm—Jianq Chyun IP Office

(57) ABSTRACT

A circuit for an integrated interface of a PDA and a wireless communication system is suitable for integrating the PDA and the wireless communication system. The circuit includes a first serial port has two terminals, in which one of the two terminals is electrically connected to the PDA, and another one of the two terminals is electrically connected to the wireless communication system. The first serial port is used to bi-directionally transmit a control signal between the PDA and the wireless communication system. A second serial port has two terminals, in which one of the two terminals is electrically connected to the PDA, and another one of the two terminals is electrically connected to the wireless communication system. The second serial port is used to bi-directionally transmit data between the PDA and the wireless communication system.

21 Claims, 7 Drawing Sheets

U.S. PATENT DOCUMENTS

| | | | | |
|---|---|---|---|---|
| 5,606,594 | A * | 2/1997 | Register et al. | 455/556.2 |
| 5,675,524 | A * | 10/1997 | Bernard | 708/109 |
| 5,797,089 | A * | 8/1998 | Nguyen | 455/403 |
| 5,821,736 | A * | 10/1998 | Yeon | 320/148 |
| 6,031,999 | A * | 2/2000 | Ogawa | 396/303 |
| 6,034,621 | A * | 3/2000 | Kaufman | 340/7.21 |
| 6,134,391 | A * | 10/2000 | Takahashi | 396/277 |
| 6,233,464 | B1 * | 5/2001 | Chmaytelli | 455/556.2 |
| 6,434,403 | B1 * | 8/2002 | Ausems et al. | 455/556.2 |
| 6,442,637 | B1 * | 8/2002 | Hawkins et al. | 710/300 |
| 6,516,202 | B1 * | 2/2003 | Hawkins et al. | 455/556.2 |
| 6,571,308 | B1 * | 5/2003 | Reiss et al. | 710/315 |
| 6,745,047 | B1 * | 6/2004 | Karstens et al. | 455/556.1 |
| 6,801,812 | B2 * | 10/2004 | Lin et al. | 700/84 |
| 6,813,344 | B1 * | 11/2004 | Lemke | 379/142.06 |
| 6,915,142 | B1 * | 7/2005 | Wietfeldt | 455/557 |
| 7,278,032 | B2 * | 10/2007 | Chuang et al. | 713/300 |
| 2001/0016918 | A1 | 8/2001 | Alexander et al. | |
| 2002/0127987 | A1 | 9/2002 | Kent | |
| 2003/0157961 | A1 * | 8/2003 | Glover | 455/557 |
| 2007/0293278 | A1 | 12/2007 | Chuang et al. | |

FOREIGN PATENT DOCUMENTS

| | | |
|---|---|---|
| CN | 1332566 | 1/2002 |
| EP | 0591973 | 4/1994 |
| EP | 0926507 | 6/1999 |
| JP | 2001-313690 | 11/2001 |
| WO | 97/09813 | 3/1997 |
| WO | 99/35557 | 7/1999 |
| WO | 01/39167 | 5/2001 |
| WO | 01/61872 | 8/2001 |

OTHER PUBLICATIONS

"Palm Handhelds to Receive GSM Data and Voice Connection With Realvision Snap-On", Sep. 22, 2000.

"FAQ for CarpeDiem V", Aug. 23, 2002.

"Search Report of European Counterpart Application" issued on Apr. 28, 2003, p. 1-p. 4.

"Office Action of European Counterpart Application" issued on Nov. 26, 2007, p. 1-p. 6.

"Office Action of European Counterpart Application" issued on Mar. 12, 2010, p. 1-p. 7.

"1st Office Action of Chinese Counterpart Application" issued on Feb. 22, 2008, with English Translation thereof, p. 1-p. 10.

"Office Action of Japan Counterpart Application" issued on Nov. 4, 2005, with English Translation thereof, p. 1-p. 7.

"Search Report of European Counterpart Application" issued on Apr. 15, 2010, p. 1-p. 4.

"Office Action of European Counterpart Application" issued on Apr. 29, 2010, p. 1-p. 7.

\* cited by examiner

CIRCUIT AND OPERATING METHOD FOR INTEGRATED INTERFACE OF PDA AND WIRELESS COMMUNICATION SYSTEM

CROSS-REFERENCE TO RELATED APPLICATION

This application is a continuation of a prior application Ser. No. 10/249,403, filed Apr. 7, 2003. The prior application Ser. No. 10/249,403 claims the priority benefit of Taiwan application serial no. 91118369, filed on Aug. 15, 2002.

BACKGROUND OF THE INVENTION

1. Field of Invention

The present invention generally relates to a circuit and operating method for an integrated interface of a PDA and a wireless communication system, and more particularly, to a circuit, operating method for executing turn-on-device, power-saving, power-shortage determining, and power-charging for the integrated interface of a PDA and a wireless communication system.

2. Description of Related Art

In line with personal computer capability enhancement, the demands of portable computers increase accordingly and their functions are getting more and more mature. In the beginning, portable computer meant a lighter weight desktop computer that had to use household power supply. However, along with the development of LCD and the long-term battery, the notebook started to be accepted and used widely. The weight of a general notebook is about 2.5 kg to 3.5 kg. Therefore, the notebook indeed provides a perfect portability while keeping the complete functionality of a personal computer.

Since the notebook has acquired excellent performance in the market, many people have aggressively dedicated themselves to the development of a smaller computer. However, due to the limitation of display size and suitable input equipment, the development of the smaller computer had limited improvement. Nevertheless, finally there has been one smaller computer to breakthrough the difficulties mentioned above and be well accepted in the market. This is a computer that uses few buttons and a touch screen as input equipment, generally called the Personal Digital Assistant (PDA).

With PDA's high portability, plus the Optical Character Recognition (OCR) software, there is no much difference between a PDA and a general notebook in the convenience level of data input anymore. Therefore, the PDA is getting more and more popular in the market. The most common purpose of the general PDA is to provide the related information for daily living, such as calendar, railroad/bus time table, telephone numbers, and even domestic maps, etc. The general reason why a user uses a PDA is for its excellent portability, with which a user can get the information mentioned above to use a telephone at any time, any place. In order to contact with others at any time and any place, or to acquire the most updated and suitable information, a different sort of the wireless communication systems such as the Global System for Mobile (GSM) system or the General Packet Radio Service (GPRS) system are used to communicate with others, or through these wireless communication systems connecting to the Internet to acquire the most updated information. Either one of the above is a wonderful option.

However, PDA and all other wireless communication systems are sold independently in the current market. Therefore, besides purchasing a PDA and wireless communication systems, in order to connect to the Internet and acquire information easily, it is also necessary to purchase an appropriate network interface or use a more expensive infrared communication device to have mutual information exchange between a PDA and a wireless communication system. Therefore, users not only have to consider the compatibility between different products when they are purchased, but also have to carry all kinds of equipment for providing interfaces, which is really troublesome.

SUMMARY OF THE INVENTION

The present invention provides a circuit and operating method for an integrated interface of a PDA (Personal Digital Assistant) and a wireless communication system. The interface between the PDA and the wireless communication system is provided to integrate the PDA and the wireless communication system, and to further enhance the whole utilization between the PDA and the wireless communication system.

The present invention provides a circuit and operating method for integrated interface of PDA and wireless communication system. It is suitable for integrating the PDA and the wireless communication system. The circuit includes two serial ports, the serial ports are electrically connected between the PDA and the wireless communication system, and one of the two ports is used to transmit a control signal, and another one of the two ports is used to transmit a data signal.

In a preferred embodiment of the present invention, the circuit provided by the present invention further comprises a power system, wherein the power system provides power to the PDA and the wireless communication system, and also provides a power-shortage signal to the PDA and the wireless communication system when power is insufficient. In another preferred embodiment of the present invention, the power system determines a method for supplying power to a PDA according to an idle signal received from the PDA. Moreover, in another embodiment of the present invention, the power system provides a charging signal to the wireless communication system when it is charged from outside, and the wireless communication system determines the charging mode according to the charging signal and the power system potential.

The present invention further provides an operating method for an integrated interface of a PDA and wireless communication system. The interface used by the operating method comprises a PDA-turn-on-wireless-communication-system signal line, a PDA-reset-wireless-communication-system signal line, a PDA-state signal line, wireless-communication-system-state/wake-up-PDA signal line and two serial ports. Wherein, one of the two ports located between the PDA and the wireless communication system is used to transmit the control signal and the status data of the wireless communication system state such as the antenna intensity and the battery capacity by using the multi-channel method, and another one of the two ports is used to transmit a digital data signal.

In an embodiment of the present invention, the following turn-on-device method is further used by the operating method according to the present invention in the first time PDA power-on: turning on the PDA first, and further checking the status of the wireless communication system. If the status of the wireless communication system observed is turn-on during the checking process, the wireless communication system is reset via the PDA-reset-wireless-communication-system signal line; otherwise, if the status of the wireless communication system is turn-off, the wireless communication system is turned on and reset via the PDA-turn-on-wireless-communication-system signal line. After performing the reset operation of the wireless communication system mentioned above, the status of the wireless communication system is further checked after waiting for a certain period of time. If the status of the wireless communication system observed is normal in the present time's wireless communication system status checking, the first time turn-on-device is completed; otherwise, if the status of the wireless communication system observed is abnormal, the error message is displayed to notify the external that power on of the wireless communication system turn-on-device has failed.

In another preferred embodiment, the operating method according to the present invention further comprises a set of power management system. This comprises a power-saving method, a power-shortage determining method, and a battery charging method. On the power-saving aspect, the preferred embodiment of the present invention transmits a wireless communication system state signal to the PDA when the wireless communication system starts to operate from a standby state. Meanwhile, if the PDA is currently used, the normal procedure is processed accordingly. If the PDA is in a sleep state, the PDA is wakened by the subsequent wake-up-PDA signal. However, the input source of the audio element in the PDA is switched to the wireless communication system under both states mentioned above to facilitate the usage of the wireless communication system. When the wireless communication system operates continuously and the PDA does not have any operation for a certain period of time, the PDA is switched to the sleep state.

Moreover, in the power-shortage determining method used by a preferred embodiment of the present invention, the power potential is divided into three different levels from high to low. For convenience of explanation, the potential levels from high to low are herein called the first potential, the second potential and the third potential, respectively. The power-shortage determining method used by the preferred embodiment of the present invention issues a power-shortage signal when the power potential starts to be lower than the second potential, and continuously issues the power-shortage signal until the power potential is greater than or equal to the first potential. Furthermore, if the power potential is in between the first potential and the second potential and there is no power-shortage signal, the system is operated normally. Finally, if the power potential is lower than the third potential, it is fully discharged. Moreover, in a preferred embodiment of the present invention, for example, the first potential mentioned above is about 3.6 V, the second potential is about 3.5 V, and the third potential is about 3.2 V.

The battery charging method used by another preferred embodiment of the present invention is suitable for charging the device that uses a battery as power and is charged via an external charging cable. The device further has an external charging circuit for charging a battery, and the wireless communication system has an internal charging circuit for charging a battery, too. The battery charging method performs a small-current charging via the external charging circuit mentioned above by using the external charging cable when the battery is empty, and tries to turn on the wireless communication system during the period when performing the small-current charging. After the wireless communication system is successfully turned on, when the battery potential achieves a first predetermined value, the internal charging circuit is turned on to perform charging. Furthermore, the battery can issue a charging signal to the wireless communication system when the external charging cable mentioned above connects to it, so that the wireless communication system can recognize the current charging status.

In a preferred embodiment of the present invention, the charging method is switched to the constant voltage charging when the battery potential achieves a second predetermined value that is higher than the first predetermined value mentioned above. When the battery potential falls in between the first predetermined value and the second predetermined value, the charging process can be further divided into multiple charging segments. These charging segments are distinguished from each other by using the battery potential and use charging speeds with different current values respectively.

The present invention further provides an operating method for an integrated interface of a PDA and a wireless communication system, suitable for integrating the PDA and the wireless communication system. The operating method comprises using at least one serial port to transmit a control signal and data between the PDA and the wireless communication system. In addition, when the PDA is turned on, the PDA is turned on, and the wireless communication system is turned on by the PDA.

In summary, the circuit and operating method for the integrated interface of a PDA and wireless communication system integrates a PDA and wireless communication system by using two serial ports, and further defines an integrated set of operating methods, so that the PDA and the wireless communication system can easily communicate and exchange messages with each other. However, since the serial port is a well developed interface, it is not necessary to spend much effort on it to tune it or design a new communication protocol for it when it is used by the operating method disclosed by the present invention. Moreover, its price is cheap and its cost is lower than the cost needed by the infrared system or the bluetooth system.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIG. 1 schematically shows a block diagram for the integrated interface circuit of a preferred embodiment according to the present invention.

DESCRIPTION OF THE PREFERRED EMBODIMENTS

Figure 1:
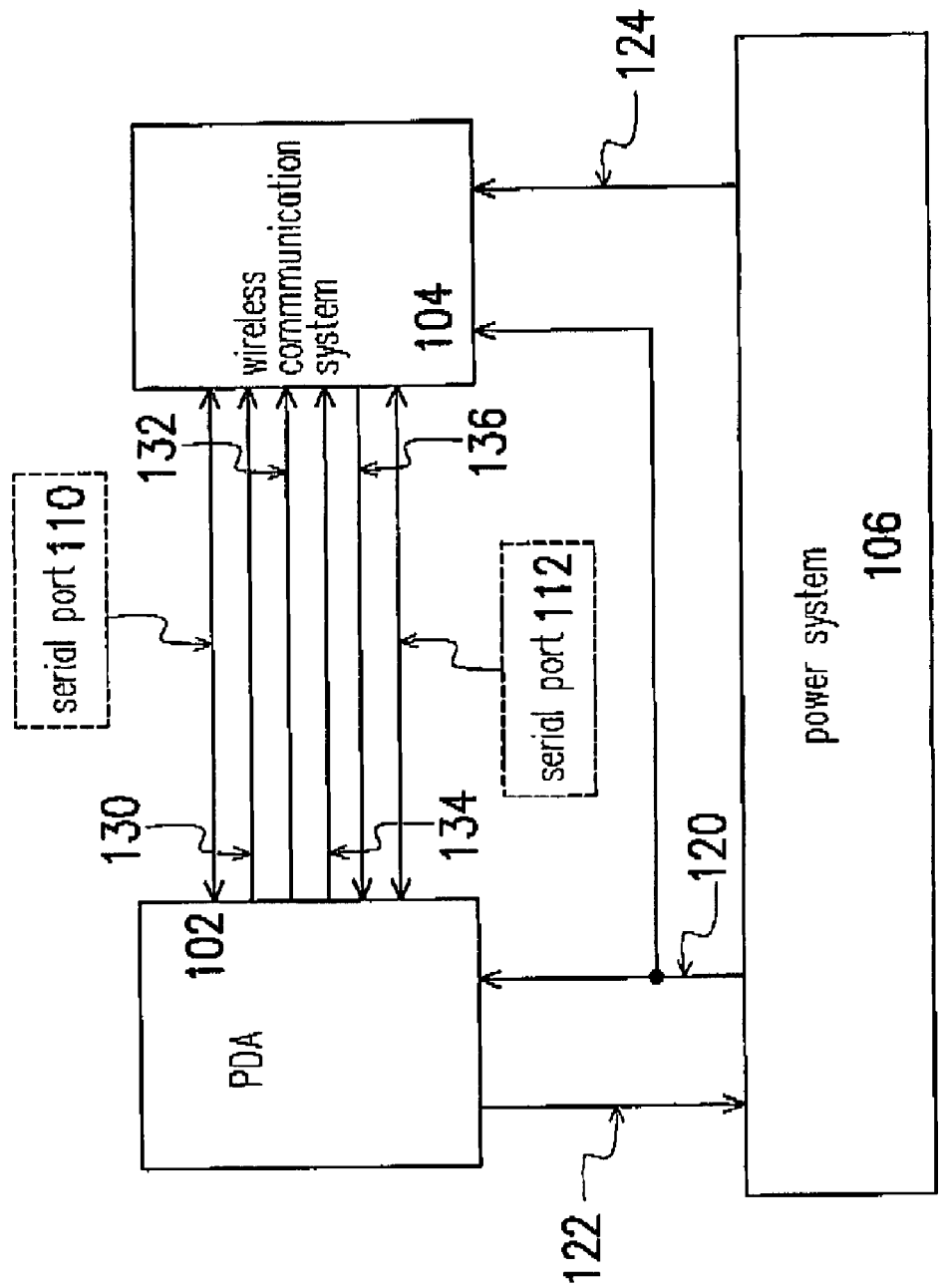

FIG. 1 schematically shows a block diagram for the integrated interface circuit of a preferred embodiment according to the present invention. The circuit for the integrated interface of the PDA (Personal Digital Assistant) and the wireless communication system shown in FIG. 1 transmits signal between the PDA 102 and the wireless communication system 104 to integrate and make them into a whole. In the present embodiment, the circuit for the integrated interface comprises a PDA-turn-on-wireless-communication-system signal line 130, a PDA-reset-wireless-communication-system signal line 132, a PDA-state signal line 134, a wireless-communication-system-state/wake-up-PDA signal line 136, two serial ports 110 and 112, and a power system 106. Wherein, the serial port 110 transmits the control signal and the status data of the wireless communication system state such as the antenna intensity and the battery capacity by using a multi-channel method, and the serial port 112 is dedicated to transmit the digital data signal. Under normal situations, the digital data signal transmitted between these two elements (usually, it is an audio signal) occupies a very long time period on the serial port. Therefore, the present invention transmits the control signal and the digital data signal via separate serial ports respectively to avoid prolonging the time for transmitting the control signal when the PDA 102 and the wireless communication system 104 transmit the digital data signal to each other. Moreover, the integrated interface does not interrupt the digital data transmission and does not impact the real timing of the digital data due to the requirement of transmitting the control signal.

Furthermore, although it is not shown in FIG. 1 precisely, the power system 106 used by the present embodiment supplies power to the PDA 102 and the wireless communication system 104 for their operation via related circuits, respectively. In addition, for the convenience of power management, the power system 106 of the present embodiment further provides a power-shortage signal to the PDA 102 and the wireless communication system 104 respectively via the signal line 120 when the power is insufficient. Moreover, the power system 106 further provides a charging signal to the wireless communication system 104 via the charging signal line 124. With the message provided by the charging signal, the wireless communication system 104 can determine the magnitude of the current and the charging circuit used for charging.

Moreover, in the present embodiment, in order to provide a further power management method, the PDA 102 transmits an idle signal to the power system 106 via the idle signal line 122 after it is idle for a certain period of time, so that the power system 106 can determine the magnitude of the power supplied to the PDA 102.

Figure 2:
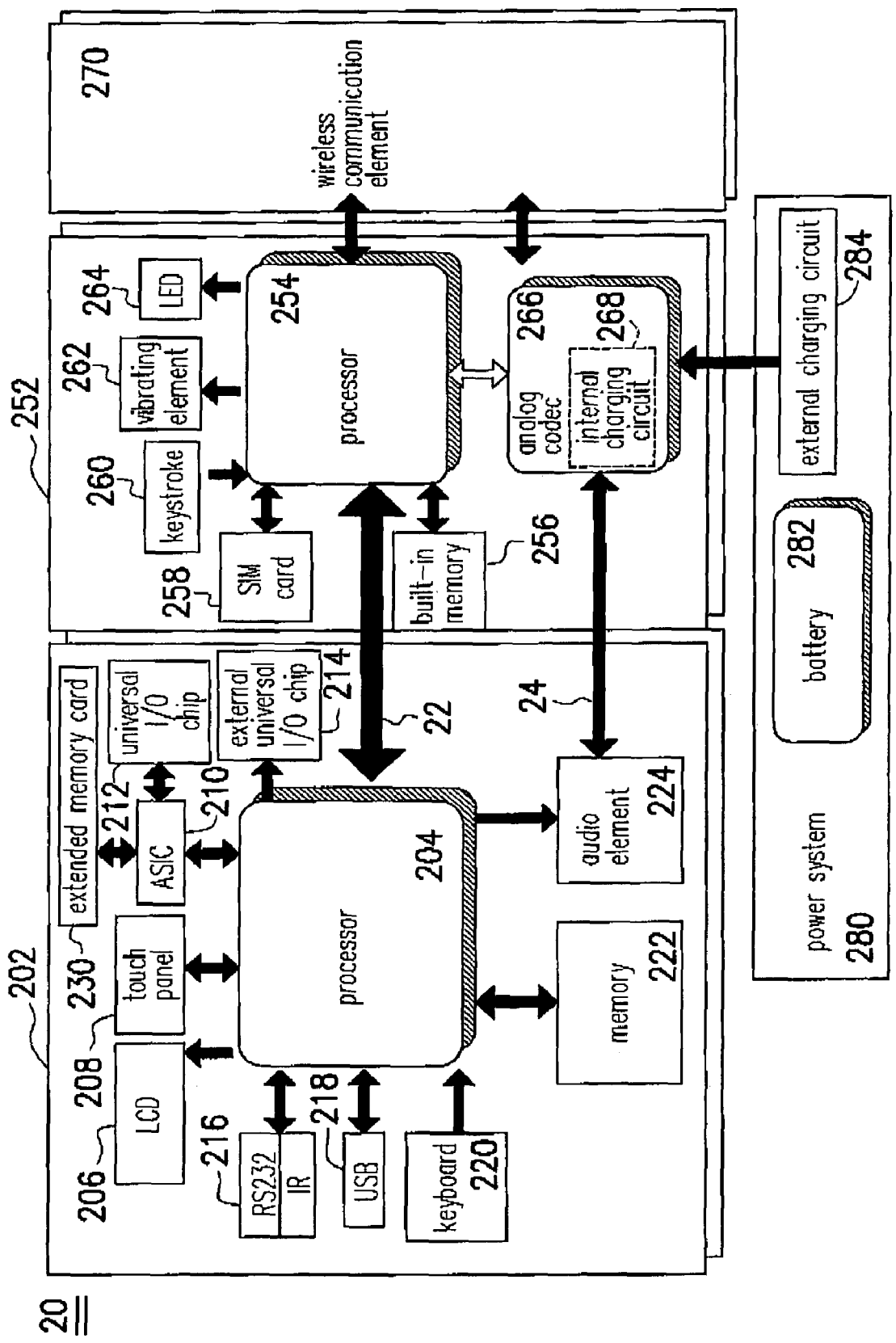
FIG. 2 schematically shows a block diagram for the integrated interface circuit of another preferred embodiment according to the present invention.

FIG. 2 schematically shows a detailed block diagram for the integrated interface circuit of another preferred embodiment according to the present invention. The device 20 comprises a PDA 202, a wireless communication system 252, a power system 280, and an integrated interface composed of a serial port 22 and a serial port 24. Wherein, the PDA 202 portion comprises a processor 204, an LCD (liquid crystal display) 206, a touch panel 208, an ASIC (Application Specific Integrated Circuit) 210, a universal I/O chip 212, an external universal I/O chip 214, an external device interface (RS232/IR) 216, a USB (Universal Serial Bus) 218, a keyboard 220, a memory 222, an audio element 224, and an extended memory card 230. The wireless communication system 225 portion comprises a processor 254, a built-in memory 256, a SIM card 258, a keyboard 260, a vibrating element 262, an LED 264, an analog Codec (coder/decoder) 266 with an internal charging circuit 268 included in it, and a wireless communication element 270 used for sending and receiving the electromagnetic wave signal. Moreover, the power system 280 used by the present embodiment is composed of the battery 282 and the external charging circuit 284. In addition, in the integrated interface used to communicate between the PDA 202 and the wireless communication system 252, the serial port 22 is used to transmit a control signal, and the serial port 24 is used to transmit a digital data signal. In order to have those skilled in the related art have better understanding of the technique contents of the present invention, the circuit block diagram shown in FIG. 2 is exemplified hereinafter to describe operating methods for the PDA and the wireless communication system provided by the present invention in detail. Furthermore, in order to reduce the complexity of drawings, the signal lines shown in FIG. 1, including the PDA-turn-on-wireless-communication-system signal line 130, the PDA-reset-wireless-communication-system signal line 132, the PDA-state signal line 134, and the wireless-communication-system-state/wake-up-PDA signal line 136 are not shown in FIG. 2. However, in order to achieve all specific functions, these signal lines are required under certain circumstances.

Figure 3:
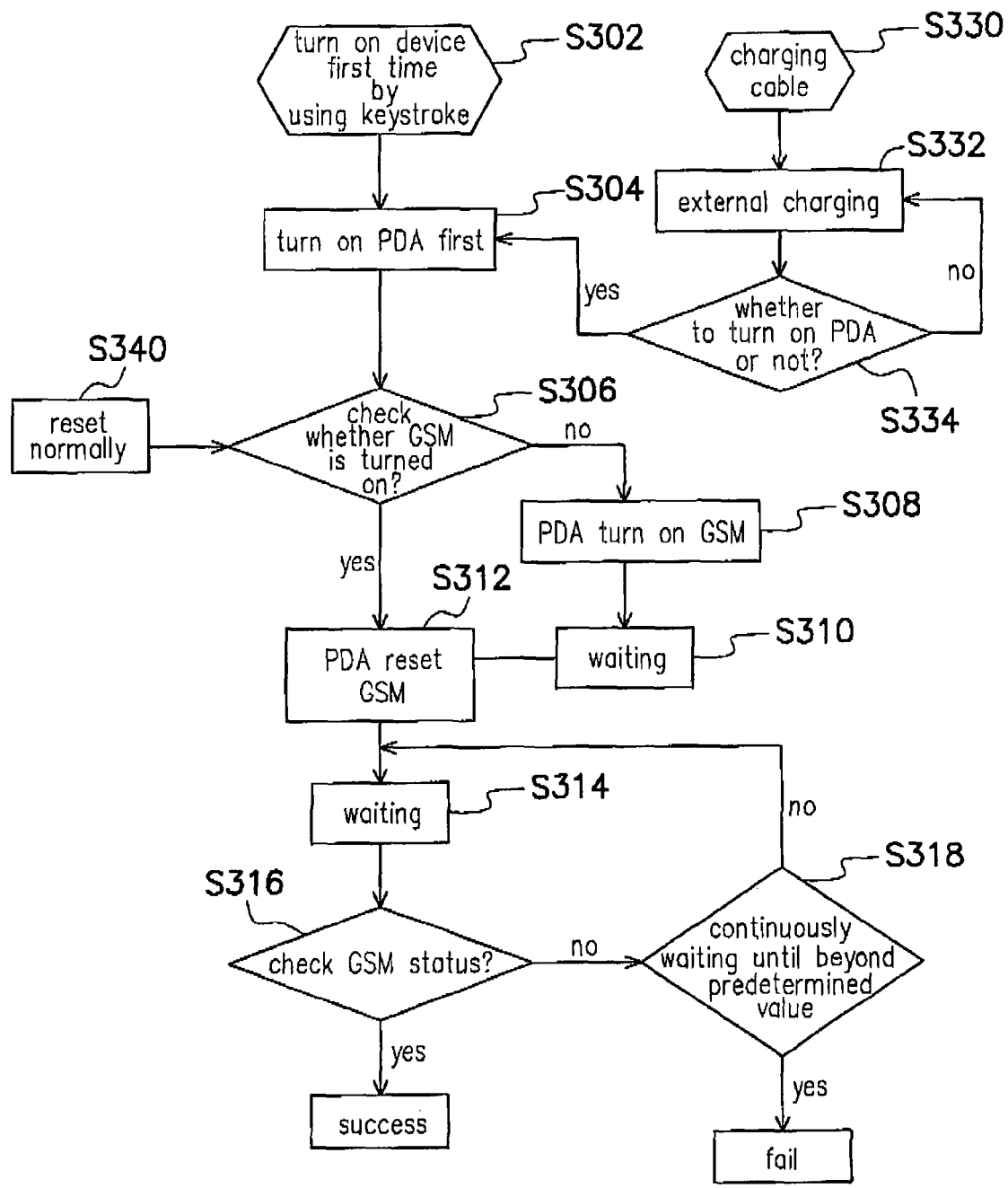
FIG. 3 schematically shows a step flow chart of a preferred embodiment that is included in the operating method for the integrated interface provided by the present invention related to the operation for turning on the system first time.

Referring to both FIG. 2 and FIG. 3 simultaneously, FIG. 3 schematically shows a step flow chart of a preferred embodiment that is included in the operating method for the integrated interface provided by the present invention and related to the operation for turning on the system first time. It has to be specified that the wording of the "turning on the system first time" used herein is switching the state of the PDA 202 from turn-off state to turn-on state. For example, the turn-on operation performed after the battery is exhausted or the PDA 202 is turned off to replace the battery belongs to the range of "turning on the system first time". Moreover, although the global system for mobile (GSM) is used as an example of the embodiment for the wireless communication system 252 in the present embodiment, it does not mean that the present invention is only suitable for the circumstance of the GSM combination, other wireless communication systems, such as the general packet radio service (GPRS) can also be applied with the same method.

In the embodiment as shown in FIG. 3, at first, for example, a keyboard is used by the user to turn on the device 20 for the first time after it is manufactured from the factory (step S302). Since the power system 280 currently used usually stores enough power for its operation, the system will turn on the PDA 202 first (step S304). Certainly, if the power system 280 does not store enough power to turn on the PDA 202, the device 20 cannot be turned on.

After the PDA 202 is turned on in step S304, the PDA 202 starts checking the status of the GSM 252 (step S306). Meanwhile, since the PDA 202 has been turned on, the processor 204 recognizes the status of the GSM 252 via the GSM-state/wake-up-PDA signal line 136. If the GSM 252 has been turned on, the PDA 202 transmits the PDA-reset-GSM signal to the processor 254 via the PDA-reset-GSM signal line 132 to reset the GSM 252 (step S312). Otherwise, if the GSM 252 is found to be turned off in step S306, the PDA 202 transmits the PDA-turn-on-GSM signal to the processor 254 via the PDA-turn-on-GSM signal line 130 to turn on the GSM 252 (step S308). After the GSM 252 has been turned on in step S308 and after waiting for a predetermined period of time (step S310), the PDA 202 performs the operation for resetting the GSM 252 as mentioned above (S312).

After the reset operation in step S312, the PDA 202 starts waiting for another predetermined period of time (step S314, and this predetermined period of time can be different from the waiting time in step S310 mentioned above). After waiting, the PDA 202 checks the status of the GSM 252 again (step S316). If the result of checking indicates the GSM 252 operates normally, the turn-on process is completed. Otherwise, if the result of checking indicates the GSM 252 does not operate normally yet (step S318), the steps S314-S316 are processed repeatedly to confirm the actual status of the GSM 252 under the circumstance that the waiting time does not exceed the length of the predetermined period of time. If the GSM 252 cannot operate normally even after waiting for the predetermined period of time, the device 20 issues an error message to notify the user that the GSM 252 turn on operation failed. In the present invention, the error message may comprise a flashing light, displaying a string on the PDA 202 or sounding a warning beep.

Although the embodiment mentioned above uses the circumstance that the device 20 is turned on the first time by the keyboard after it has been manufactured from the factory as a major foundation for description, all other methods for turning on the device that comply with the definition of "turning on device first time" can be used with the method mentioned above. For example, under the circumstance that the power of the power system 280 is completely exhausted and the device 20 has to rely on recharging via the external charging cable for resuming its operation, after the charging cable is plugged into the device 20 and starts charging the power system 280 (step S330), the power system 280 is charged gradually (step S332). Then, the device 20 tries to turn on the PDA 202 (step S334), and if the PDA 202 cannot be turned on yet, the device 20 charges the power system 280 continuously; if the power stored in the power system 280 is large enough to turn on the PDA 202, the process turns into the step S304 to turn on the PDA 202, and subsequently performs the turn-on-device operation mentioned above.

Moreover, the method provided by the present embodiment is also suitable for the general turn-on-device process after some minor modification. As shown in FIG. 3, after the PDA 202 passes the general normal reset operation (step S340), step S306 and its subsequent processes can be continued to complete the turn-on-device process.

It has to be specified herein, that when a system is charging, since there may be some leak of electricity between those two systems (PDA 202 and GSM 252), it may result in a certain unstable state, and thus the GSM 252 has to be reset after the PDA 202 is turned on to prevent the phenomenon of disorder from happening. Optionally, a switch can be designed in the power terminal of the GSM 252, and after the PDA 202 becomes stable, the PDA 202 turns on this switch to supply power to the GSM 252. Therefore, the GSM 252 is ensured not to be turned on before the main controller (i.e. PDA 202) and thus will not lose its control.

Figure 4:
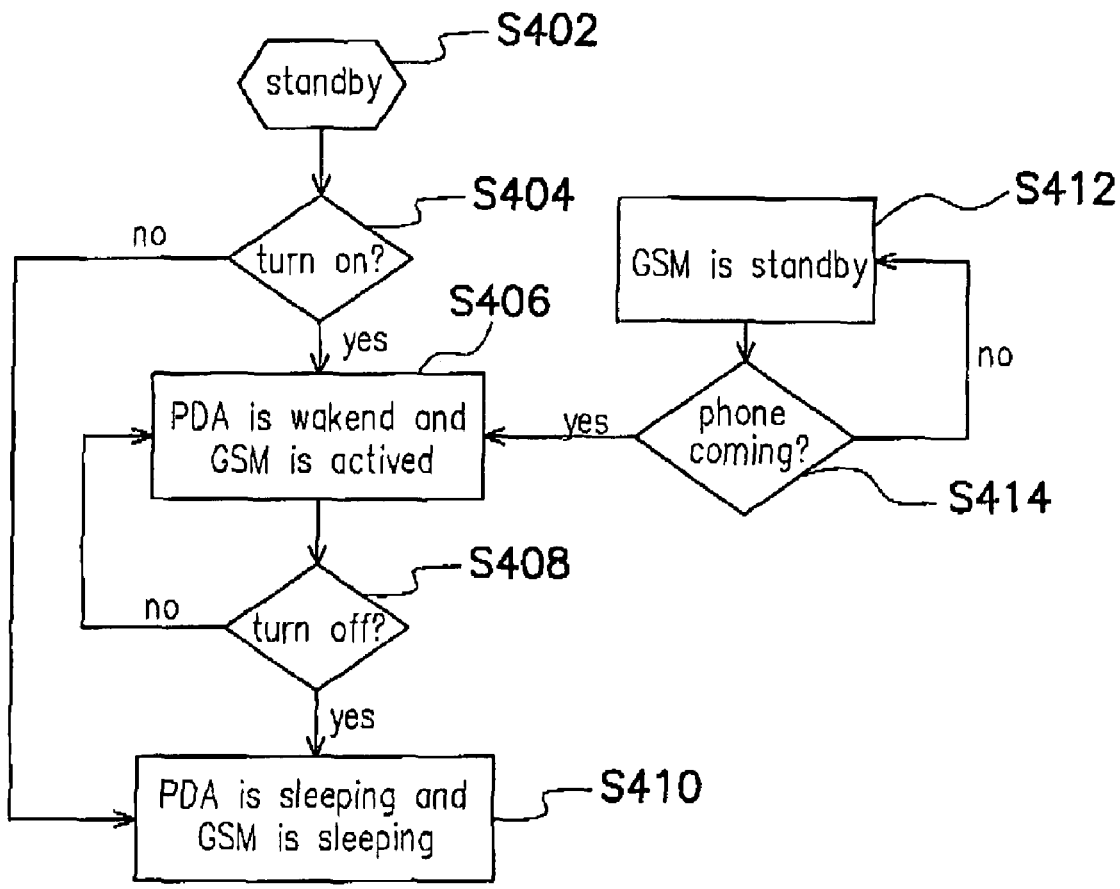
FIG. 4 schematically shows a step flow chart of the process included in the operating method for the integrated interface of a preferred embodiment according to the present invention related to the power-saving method.

FIG. 4 schematically shows a step flow chart of the process included in the operating method for the integrated interface of a preferred embodiment according to the present invention related to the power-saving method. The control process used for a general warm-turn-on-device is described herein first. Please also refer to FIG. 2 at the same time, when the PDA 202 is in the standby state (step S402), if the switch is not pressed yet, the PDA 202 keeps staying in the standby (sleep) state, and the GSM 252 enters into the sleep state (step S404-S410). If the switch is pressed while in the standby state, the PDA 202 will wake up, and the GSM 252 is activated simultaneously (step S404-S406). Afterwards, when the switch is pressed again (step S408), the PDA 202 will enter into the standby state, and the GSM 252 enters into the sleep state. When the GSM 252 is in the sleep state, the power system 280 does not provide the high frequency (e.g. 13 MHz) power to the GSM 252, saving power required for switching the state of the high frequency element under the standby state.

Referring to both FIG. 4 and FIG. 2 again, when the GSM 252 is in the standby state (it does not matter whether it is sleeping or not, i.e. step S412), the GSM 252 starts performing an operation for receiving a telephone signal for as long as it receives the telephone signal. Meanwhile, the GSM 252 transmits the GSM-state/wake-up-PDA signal to the processor 204 of the PDA 202 via the GSM-state/wake-up-PDA signal line 136 to wake up the PDA 202 first. After the PDA 202 is wakened, the input source of the audio element 224 is converted into the analog Codec 266 of the GSM 252. Therefore, the electromagnetic wave received by the wireless communication element 270 can be converted into the digital (or audio) data, and outputs it to the user via the analog Codec 266 by using the audio element 224. Moreover, if only the GSM 252 is used and there is no action applied to the PDA 202 for a certain period of time, the PDA 202 enters into the sleep state from the wake-up state to reduce the electricity wear.

In addition, there is still another method for saving the electricity wear. That is, as shown in FIG. 1, when the PDA 102 stays in the idle state, the PDA 102 provides an idle signal to the power system 106 via the idle signal line 122. The power system 106 changes to use a new method that saves more electricity to output power after it receives this idle signal, so as to save some electricity wear.

Figure 5:
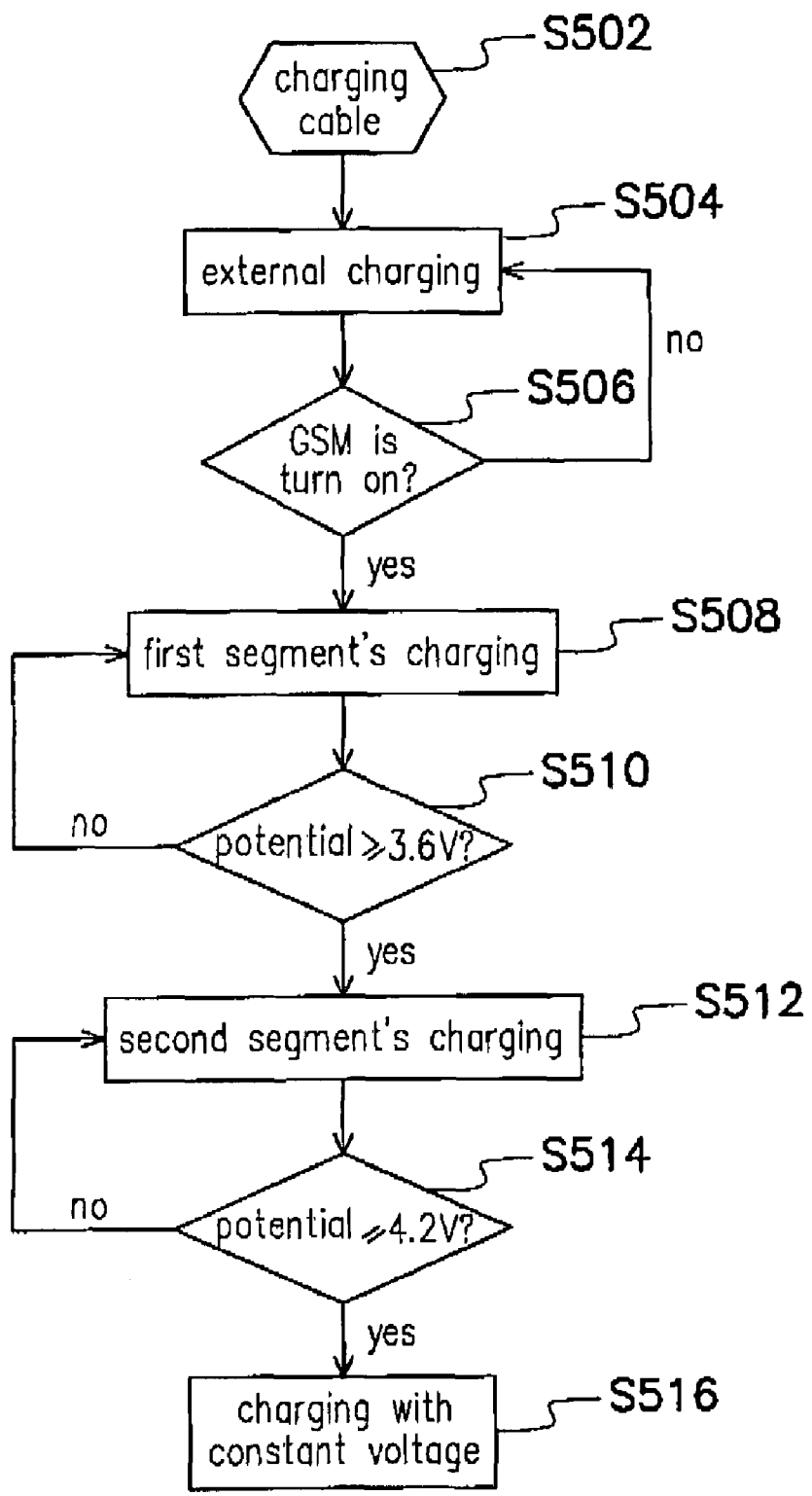
FIG. 5 schematically shows a flow chart of the steps included in the operating method for the integrated interface of a preferred embodiment according to the present invention related to power charging.

FIG. 5 schematically shows a flow chart of the steps included in a preferred embodiment according to the present invention and related to the power charging. In order to have a better understanding, please also refer to FIG. 2 at the same time. When the charging cable is plugged into the power system 280 and starts charging (step S502), the external charging circuit 284 inside the power system 280 starts charging to the battery 282 with a small-current charging method (step S504). Meanwhile, the power system 280 sends a charging signal to the GSM 252 to notify it that it is in the charging state now. After the small-current charging is started, the device 20 starts trying to turn on the GSM 252. If the GSM 252 cannot be turned on, the small-current charging is continuously performed; otherwise, if the GSM 252 is turned on successfully, the process enters into next step's charging process (step S506). After the GSM 252 is turned on successfully, the internal charging circuit 268 inside the GSM 252 starts to operate, and with this, it performs faster speed's charging to the battery 282. For example, when the potential of the battery 282 is lower than 3.6 V, the internal charging circuit 268 uses 600 mA as the current value for the first segment's charging (step S508, S510). When the potential of the battery 282 is in between 3.6 V and 4.2 V, the internal charging circuit 268 uses 900 mA as the current value for the second segment's charging (step S512, S514). After the potential of the battery 282 achieves 4.2 V, the internal charging circuit 268 changes to use the constant-voltage charging method to charge the battery 282 (step S516), so that the battery 282 is not damaged due to over-charging.

Figure 6A:
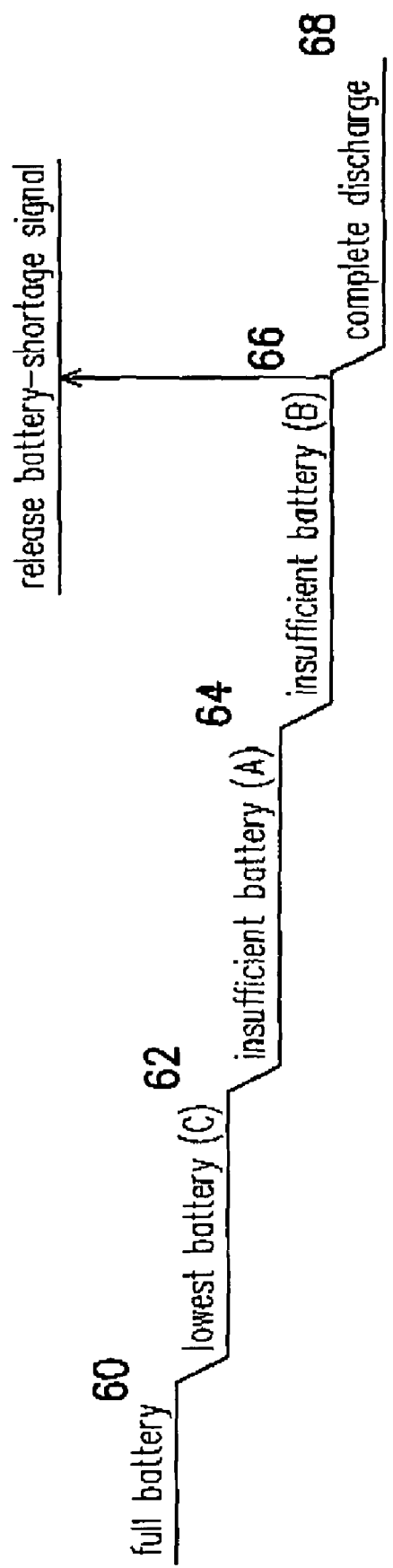
FIG. 6A schematically shows a sketch map of the potential levels used by a preferred embodiment according to the present invention.
Figure 6B:
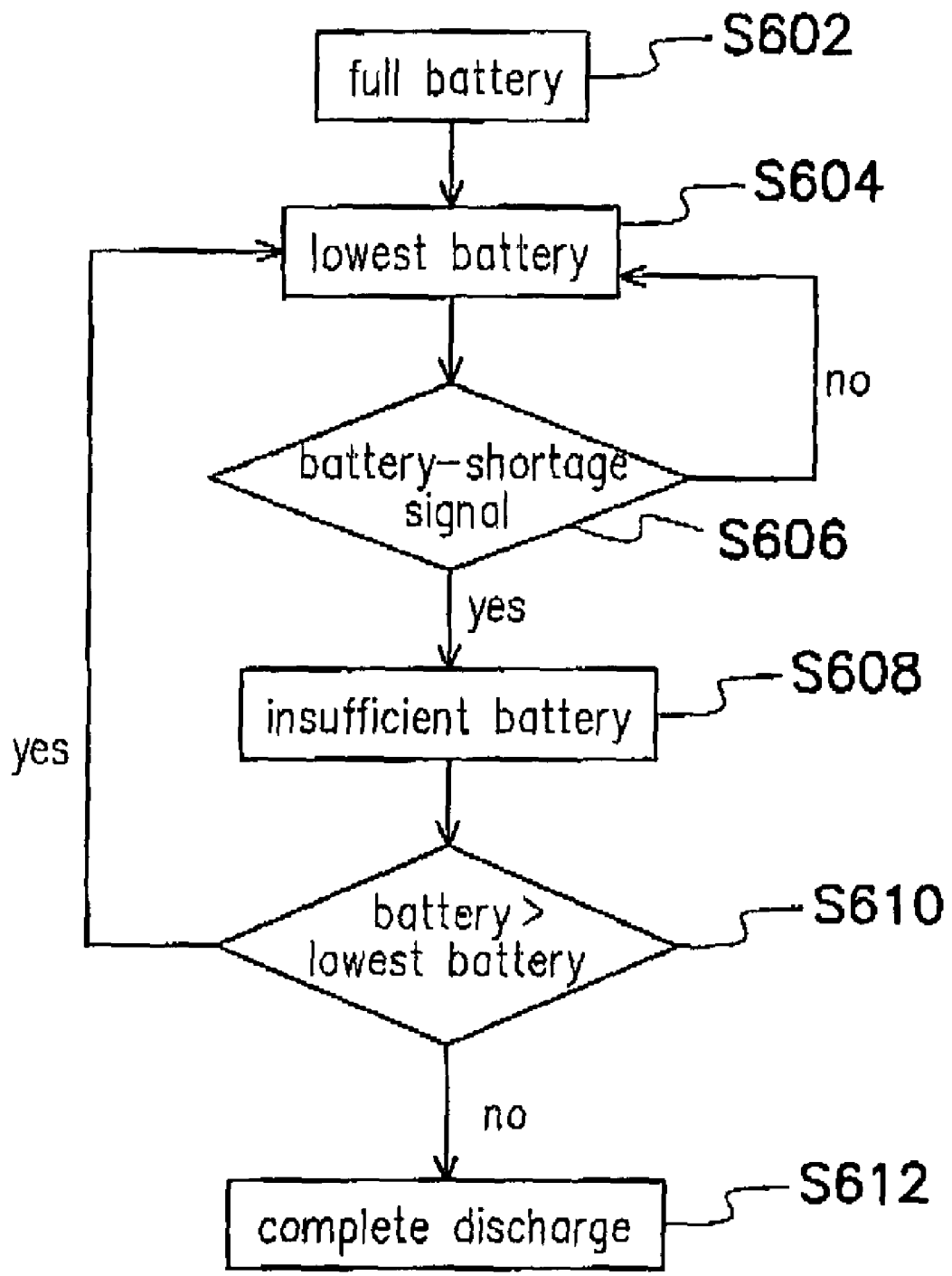
FIG. 6B schematically shows a flow chart of the steps included in the operating method for the integrated interface of a preferred embodiment according to the present invention related to the power-shortage determining method.

FIGS. 6A and 6B schematically shows a sketch map of the potential levels and a step flow chart used by a preferred embodiment according to the present invention, respectively. In FIG. 6A, the present invention divides the battery potential into five different levels, they are: full battery 60, low battery (C) 62, insufficient battery (A) 64, insufficient battery (B) 66, and complete discharge 68, respectively. In an embodiment of the present invention, the potential represented by these levels is: full battery 60 indicates the current battery potential is above 3.8 V, low battery (C) 62 indicates the current battery potential is in 3.8V~3.6 V, insufficient battery (A) 64 indicates the current battery potential is in 3.6V~3.5 V, insufficient battery (B) 66 indicates the current battery potential is in 3.5V~3.2 V, and complete discharge indicates the current battery potential is below 3.2V, respectively. Certainly, the dividing standard for the battery potential levels does not have to match the present embodiment, those skilled in the related art can appropriately adjust the dividing standard, the figures listed above are only exemplified herein and do not serve as the necessary limitation condition for the present invention.

The power-shortage determining method provided by the present invention is further described in detail hereinafter. In order to have a better understanding and facilitate the explanation, please refer to both FIG. 6A and FIG. 6B at the same time. In FIG. 6B, it is assumed that the battery 282 is in the full battery 60 state at first (step S602), meanwhile all operations for the device 20 operate normally. After the device 20 continuously uses power and makes the potential of the battery 282 fall in the range of the lowest battery (C) 62 (step S604), the power system 280 determines whether to issue the battery-shortage signal or not (step S606).

The standard used in step 606 for determining whether to issue the battery-shortage signal or not is further described hereinafter. It is assumed that the battery 282 is in low battery (C) 62, and the devices 20 are heavy loaded, such as the state when the PDA 202 is using the audio element 224 or the GSM 252 is using telephone. Since it uses more current, the potential of the battery 282 easily falls into the range of insufficient battery (B) 66 immediately. Therefore, after the potential of the battery 282 enters into the range of the low battery (C) 62, if the device 20 turns to heavy loading from light loading (e.g. sleep mode) suddenly, the power system 280 issues the battery-shortage signal when the potential of the battery 282 is lower than the insufficient battery (B) 66. If the device 20 keeps staying in the light loading, the power system 280 issues the battery-shortage signal when the potential of the battery 282 is lower than the insufficient battery (A) 64. In other words, the criteria for generating the battery-shortage signal can be adjusted automatically depending on conditions.

If after step S606, it is determined not to issue the battery-shortage signal, the battery 282 stays in the low battery state and does not enter into the insufficient battery state; if it is determined to issue the battery-shortage signal, the power system 280 provides the battery-shortage signal to the PDA 202 and GSM 252, respectively. This indicates the battery 282 has entered into the level of insufficient battery already (step S608). To be noted, the current battery potential may fall into the level of either insufficient battery (A) 64 or insufficient battery (B) 66. Once the power system 280 issues the battery-shortage signal, the battery-shortage signal is not released until the potential of the battery 282 is higher than that of the low battery (C) 62. If the user continuously uses it, after the potential of the battery 282 is lower than insufficient battery (B) 66, the power system 280 enters into the level of complete discharge and is not allowed to execute any operation.

To be specified herein, since the sudden fall of the battery voltage is commonly generated when it is changed from light loading to heavy loading, the electrical energy actually stored in the battery may still be big enough to support the power that is required for normal operation. Therefore, the battery-shortage determining method provided by the present invention can avoid the condition of abnormal device turn-on and turn-off resulting from the system not recognizing the battery-shortage due to the light loading to heavy loading change by flexibly adjusting the criteria for determining battery-shortage.

In summary, the advantages of the present invention are described hereinafter. The present invention transmits control signals and digital data respectively by using two serial ports, thus to simplify the communication protocol generally considered and used to transmit control signals and digital data simultaneously by using a single serial port. Moreover, not only is the hardware cost much less than the cost needed for infrared system or bluetooth system, but also provides an efficient method for managing power, so that power waste can be eliminated.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A circuit for an integrated interface of a PDA and a wireless communication system, suitable for integrating the PDA and the wireless communication system, the circuit comprising:
    a first serial port, having two terminals, wherein one of the two terminals is electrically connected to the PDA, another one of the two terminals is electrically connected to the wireless communication system, and the first serial port is used to bi-directionally transmit a control signal between the PDA and the wireless communication system; and
    a second serial port, having two terminals, wherein one of the two terminals is electrically connected to the PDA, another one of the two terminals is electrically connected to the wireless communication system, and the second serial port is used to bi-directionally transmit audio data between the PDA and the wireless communication system.

2. The circuit of claim 1, further comprising a power system, the power system providing a power to the PDA and the wireless communication system respectively, and determining the magnitude of the power provided to the PDA according to an idle signal transmitted from the PDA.

3. The circuit of claim 2, wherein the power system provides a power-shortage signal to the PDA and the wireless communication system respectively when the power is insufficient.

4. The circuit of claim 1, wherein the first serial port is further used to transmit status data of the wireless communication system.

5. The circuit of claim 4, wherein the status data includes an antenna intensity.

6. The circuit of claim 1, wherein the audio data is digital data.

7. The circuit of claim 6, wherein the wireless communication system includes a wireless communication element used for receiving an electromagnetic wave signal, and the electromagnetic wave signal is converted into the digital data.

8. The circuit of claim 7, wherein the PDA includes an audio element for receiving the digital data through the second serial port.

9. An operating method for an integrated interface of a PDA and a wireless communication system, suitable for integrating the PDA and the wireless communication system, the operating method comprising:

using a first serial port to bi-directionally transmit a control signal between the PDA and the wireless communication system; and using a second serial port to bi-directionally transmit audio data between the PDA and the wireless communication system.

10. The method of claim 9, wherein the audio data is digital data.

11. The method of claim 10, further comprising:
receiving an electromagnetic wave signal by a wireless communication element; and
converting the electromagnetic wave signal into the digital data.

12. An operating method for an integrated interface of a PDA and a wireless communication system, suitable for integrating the PDA and the wireless communication system, the operating method comprising:
using a first serial port to transmit a control signal between the PDA and the wireless communication system;
using a second serial port to transmit audio data between the PDA and the wireless communication system; and
when the PDA is turned on, performing the following steps:
turning on the PDA; and
turning on the wireless communication system by the PDA.

13. The operating method of claim 12, further comprising:
resetting the wireless communication system after turning on the wireless communication system.

14. The operating method of claim 13, further comprising:
after resetting the wireless communication system and waiting for a first predetermined period of time, checking a status of the wireless communication system;
if the status of the wireless communication system is normal, the turn-on-device is completed; and
if the status of the wireless communication system is abnormal, displaying an error message to indicate that turning on the wireless communication system is in failure.

15. The operating method of claim 12, wherein the step of turning on the wireless communication system by the PDA, further comprising:
transmitting a PDA-turn-on-wireless-communication-system signal from the PDA to the wireless communication system to turn on the wireless communication system.

16. A circuit for an integrated interface of a PDA and a wireless communication system, suitable for integrating the PDA and the wireless communication system, the circuit comprising:
a first serial port, having two terminals, wherein one of the two terminals is electrically connected to the PDA, another one of the two terminals is electrically connected to the wireless communication system, and the first serial port is used to transmit status data of the wireless communication system between the PDA and the wireless communication system; and
a second serial port, having two terminals, wherein one of the two terminals is electrically connected to the PDA, another one of the two terminals is electrically connected to the wireless communication system, and the second serial port is used to transmit audio data between the PDA and the wireless communication system.

17. The circuit of claim 16, wherein the status data includes one of an antenna intensity and a battery capacity.

18. The circuit of claim 16, wherein the audio data is digital data.

19. The circuit of claim 18, wherein the wireless communication system includes a wireless communication element used for receiving an electromagnetic wave signal, and the electromagnetic wave signal is converted into the digital data.

20. The circuit of claim 19, wherein the PDA includes an audio element for receiving the digital data through the second serial port.

21. The circuit of claim 16, wherein the status data includes an antenna intensity.

* * * * *